UNITED STATES PATENT OFFICE.

JOHN HERBERT THWAITES, OF PETERBOROUGH, ENGLAND.

TREATMENT OF PYRITES LIQUOR FOR WINNING METALS THEREFROM.

No. 921,312.　　　　Specification of Letters Patent.　　Patented May 11, 1909.

Application filed July 8, 1908. Serial No. 442,520.

*To all whom it may concern:*

Be it known that I, JOHN HERBERT THWAITES, a subject of the King of Great Britain, residing at Market Chambers, Peterborough, in the county of Northampton, England, chemical engineer, have invented certain new and useful Improvements in the Treatment of Pyrites Liquors for Winning Metals Therefrom, of which the following is a specification.

This invention relates to the treatment of liquors obtained from pyrites, pyrites cinder and the like for the purpose of recovering metals therefrom and for preparing the liquors so that white zinc compounds can be precipitated therefrom.

The invention deals only with liquors practically free from copper, which will be assumed to have been removed as far as practicable if present.

For the purpose of this invention there is added to the liquor, whether sulfate of soda has been removed or not, zinc oxid whether hydrated or carbonated or not, in the form of a cream or fine powder or other effective state, the reactions being represented by the following chemical equations:—

$$2FeSO_4 + 2ZnO + O + xH_2O =$$
$$Fe_2O_3 \cdot xH_2O + 2ZnSO_4$$
$$Fe_2 3SO_4 + 3ZnO + xH_2O =$$
$$Fe_2O_3 \cdot xH_2O + 3ZnSO_4.$$

The quantity of zinc oxid necessary is slightly more than that chemically equivalent to the iron present in the solution, a convenient outside excess being five per cent. The whole is well mixed by constant or intermittent agitation and the iron compounds present are oxidized by blowing in or otherwise supplying air, oxygen or other oxidizing agent incapable of peroxidizing and precipitating cobalt in this solution. To hasten the action the liquor is heated and is preferably maintained at or near boiling point 90° C. being a convenient temperature. The zinc oxid dissolves in the liquor and the iron is precipitated as a hydrated oxid in a readily separable form sometimes containing basic iron compounds; alumina, if present, is also precipitated provided the temperature is at or almost at the boiling point.

In order to economize the oxidizing agent and time, the precipitation of the iron may be carried out in two or more stages, the precipitate being removed by filtration or otherwise between the stages and care being taken that the amount of zinc precipitant added at each stage is not so large that some of it remains undissolved and is removed with the iron precipitate; should this happen, the precipitate may be added to another batch of the liquor to recover the zinc in working up that batch.

Greater latitude in the addition of the zinc precipitate is allowable if chlorids are present, as a small excess of the former dissolves as a zinc oxychlorid and loss is thus minimized; it is therefore convenient, though by no means necessary, to have chlorids present for this reason and also because the reactions are completed in less time, and if any known apparatus be used which is adapted to break up or prevent the formation of clots or cores of the precipitant, the excess, if any, of the latter necessary for complete removal of the iron, is very slight. The time required for the oxidation of the iron depends upon the quantity of ferrous iron present, on the temperature and largely on the form of apparatus used, an adequate air supply being of course provided.

The iron precipitate formed is denser than iron hydrates precipitated in the usual ways; it subsides quickly and is easily filtered and washed, even though it contains alumina. When washed it is suitable for many purposes, for example the preparation of oxid paints.

Alkalies or alkaline earths, either caustic or carbonate may be used instead of the zinc compounds for precipitating the iron, but the precipitate produced is bulky and difficult to manipulate, especially if alumina is present, and on the large scale their use is not advisable. Should it be inadvisable to obtain oxids of manganese and cobalt as separate products, the iron oxid precipitate need not be separated from the liquor until after the stage next to be described.

The liquor is now treated with an alkaline hypochlorite, or with an alkali or zinc oxid and chlorin, or with an equivalent peroxidizing material or mixture, and it is heated to expedite the reaction. Manganese, cobalt, and nickel, or such of them as may be present, are thus precipitated, the following equations being typical of the reaction:—

$$MnSO_4 + NaClO + 2NaOH + xH_2O =$$
$$MnO_2 \cdot xH_2O + Na_2SO_4 + NaCl + H_2O$$
$$2CoCl_2 + 3Zn(OH)2 + Cl_2 + xH_2O =$$
$$Co_2O_3 \cdot xH_2O + 3ZnCl_2 + 3H_2O.$$

The precipitate is filtered or otherwise removed and is worked up in any known manner to obtain the metals or their compounds. If, after the previous operation any iron was left in the solution, it will be contained in the precipitate of oxids produced at this stage; there must, however, be no trace of this metal left in the liquor now if the purest white sulfid pigments of zinc are to be easily obtained. Occasionally a small amount of permanganate may be formed during the peroxidizing treatment, in which case the liquor will be colored pink; this may be disregarded if treatment with an alkali sulfid follows before the final liquor containing zinc salts is treated in any way for producing zinc compounds; but if such sulfid treatment is not to follow the permanganate is best reduced by a suitable agent and the manganese precipitated by a careful repetition of the peroxidizing treatment.

To the liquor is next added a quantity of a soluble sulfid or of sulfureted hydrogen sufficient to precipitate any cadmium which may be present, according to the equations:—

$$CdCl_2 + Na_2S = CdS + 2NaCl,$$

or $$CdCl_2 + H_2S + 2NaOH = CdS + 2NaCl + 2H_2O,$$

together with certain of the metals which may have remained in solution notwithstanding the previous treatment. The precipitate formed is filtered or otherwise removed, and may be worked up, if desired, for the metals contained in it, or their compounds. The aforesaid sulfid treatment may be applied either before or after the removal of the iron from the liquor, instead of at this stage; as, however, it constitutes a remedy against possible careless working or accident, it is preferable to apply it after the peroxidizing treatment. It is obvious that if a sample of the liquor after the last named treatment gives a precipitate consisting only of white zinc sulfid on the addition of an alkali sulfid, the treatment to remove cadmium or other metals may be omitted.

There now remains a liquor containing chlorids or sulfates or other salts of zinc, with or without other salts such as those of sodium, which liquor yields by known treatment zinc compounds or white zinc pigments, such as carbonate, oxid or sulfid according to the following typical equations:

$$ZnCl_2 + Na_2CO_3 = ZnCO_3 + 2NaCl;$$
$$ZnSO_4 + BaS = ZnS + BaSo_4$$

and the liquor remaining from such treatment may be made to yield any other compounds that it may contain, such as sodium sulfate or chlorid or both.

In my British specification No. 27515 of 1906 I have described a mode of treating or utilizing pyrites cinder and other metallic sulfids low in sulfur, and I do not herein claim anything described or claimed in that specification.

Having thus described the nature of the said invention and the best means I know of carrying the same into practical effect, I claim:—

1. A treatment of liquors obtained from pyrites cinder or the like and from which copper has been removed if present, consisting in adding to the liquor a zinc compound adapted to precipitate iron as hydrated ferric oxid, then peroxidizing the mixture, then removing the precipitate thus formed and finally adding a sulfid adapted to remove materials which would prevent the precipitation of white zinc sulfid from the liquor.

2. A treatment of liquors obtained from pyrites cinder or the like and from which copper has been removed if present, consisting in adding to the liquor a zinc compound adapted to precipitate iron as hydrated ferric oxid, then oxidizing ferrous iron in the liquor, then removing the precipitate thus formed, then peroxidizing the liquor, then removing the precipitate thus formed and finally adding a sulfid adapted to remove materials which would prevent the precipitation of white zinc sulfid from the liquor.

3. A treatment of liquors obtained from pyrites cinder or the like and from which copper has been removed if present, consisting in first adding to the liquor a sulfid adapted to precipitate metals of the copper and lead groups, then separating the precipitate thus produced, then adding to the liquor a compound of zinc adapted to precipitate hydrated ferric oxid, then peroxidizing the mixture and finally removing the precipitate thus produced.

4. A treatment of liquors obtained from pyrites cinder or the like and from which copper has been removed if present, consisting in first adding to the liquor a sulfid adapted to precipitate metals of the copper and lead groups, then separating the precipitate thus produced, then adding to the liquor a compound of zinc adapted to precipitate hydrated ferric oxid, then oxidizing ferrous iron in the liquor, then removing the precipitate thus produced, then peroxidizing the liquor and finally removing the precipitate thus produced.

5. A treatment of liquors obtained from pyrites cinder or the like and from which copper has been removed if present, consisting in adding to the liquor a zinc compound adapted to precipitate iron as hydrated ferric oxid, then oxidizing ferrous iron in the liquor, then removing the precipitate thus formed, then adding to the liquor a sulfid adapted to precipitate metals of the copper and lead groups, then removing the precipitate thus formed, then peroxidizing the liquor and finally removing the precipitate thus formed.

6. A treatment of liquors obtained from pyrites cinder or the like and from which copper has been removed if present, consisting in adding to the liquor a zinc compound adapted to precipitate iron as hydrated ferric oxid, then adding to the liquor a sulfid adapted to precipitate metals of the copper and lead groups, then removing the precipitate, then peroxidizing the liquor and finally removing the precipitate thus formed.

In testimony whereof I have signed my name to this specification in the presence of two subscribing witnesses.

JOHN HERBERT THWAITES.

Witnesses:
   Geo. J. W. Franklin,
   Walter J. Skerten.